US005903976A

United States Patent [19]

Beaurain et al.

[11] Patent Number: 5,903,976

[45] Date of Patent: May 18, 1999

[54] METHOD OF MANUFACTURING A COMBUSTION ENCLOSURE WITH COOLING BY TRANSPIRATION

[75] Inventors: André Beaurain, Chambly; Etienne Tiret, La Chapelle Reanville, both of France

[73] Assignee: Societe Europeenne de Propulsion, Suresnes, France

[21] Appl. No.: 08/995,307

[22] Filed: Dec. 22, 1997

Related U.S. Application Data

[62] Division of application No. 08/637,441, Apr. 25, 1996, Pat. No. 5,732,883.

[30] Foreign Application Priority Data

Apr. 27, 1995 [FR] France ........ 95 05058

[51] Int. Cl.[6] ........ B23P 15/00

[52] U.S. Cl. ........ 29/890.01; 29/428

[58] Field of Search ........ 29/890.01, 428; 239/127.1, 127.3, 266.11, 265.7, 269.19; 60/267, 271

[56] References Cited

U.S. PATENT DOCUMENTS

| | | | |
|---|---|---|---|
| 2,857,657 | 10/1958 | Wheeler | 29/156.8 |
| 3,153,320 | 10/1964 | Prosser | 60/35.6 |
| 3,188,801 | 6/1965 | Prosser | 60/35.6 |
| 3,353,359 | 11/1967 | Web et al. | 60/265 |
| 3,585,800 | 6/1971 | Kuntz . | |
| 3,832,290 | 8/1974 | Fortini . | |
| 3,910,039 | 10/1975 | Fortini . | |
| 4,582,678 | 4/1986 | Niino et al. | 29/890.01 |
| 4,856,163 | 8/1989 | Horiuchi et al. | 29/890.01 |
| 5,233,755 | 8/1993 | Vandendriessche | 29/890.01 |
| 5,363,645 | 11/1994 | Pellet | 29/890.01 |
| 5,477,613 | 12/1995 | Bales et al. | 29/890.01 |
| 5,546,656 | 8/1996 | Hartman et al. | 29/890.01 |

FOREIGN PATENT DOCUMENTS

| | | |
|---|---|---|
| 2130040 | 11/1972 | France . |
| 2691209 | 11/1993 | France . |

OTHER PUBLICATIONS

"Transpiration and Regenerative Cooling of Rocket Engine", NTIS Tech Notes, Jan. 1990, Springfield, Virginia, U.S.A., pp. 45, XP 000104292.

*Primary Examiner*—I Cuda
*Attorney, Agent, or Firm*—Weingarten, Schurgin, Gagnebin & Hayes LLP

[57] ABSTRACT

The invention relates to a method of manufacturing an enclosure containing hot gases cooled by transpiration. The enclosure comprises a porous wall and means for applying a cooling fluid to the outside face of the porous wall to cause a flow of cooling fluid to pass through the porous wall by transpiration. The cooling fluid application means is formed by disposing a plurality of cooling liquid distribution pipes regularly around the porous wall and terminating tangentially on its outside face in a plurality of superposed horizontal injection levels. Feed channels are provided crossing substantially perpendicularly through the distribution pipes, formed between each of them, and connected to cooling liquid feed means. Calibration ducts of determined section are provided, connecting, at each of the injection levels, the vertical feed channels to the horizontal distribution pipes surrounding them, to deliver predetermined headloss to the inside face of the porous wall. The headloss is adapted as a function of the zone to be cooled to optimize cooling flow rates along the porous wall.

12 Claims, 4 Drawing Sheets

METHOD OF MANUFACTURING A COMBUSTION ENCLOSURE WITH COOLING BY TRANSPIRATION

This application is a division of U.S. Ser. No. 08/637,441, filed Apr. 25, 1996, now U.S. Pat. No. 5,732,883.

FIELD OF THE INVENTION

The present invention relates to using transpiration to cool an enclosure containing hot gases such as a hot gas line, a boiler, or a combustion chamber of a rocket engine, or of a gas generator, or of a prechamber.

PRIOR ART

Various systems are already known for cooling porous walls by transpiration.

The flux, known as "transpiration", of a cold fluid from a first face of a porous wall situated on the same side as a low temperature source towards the second face of the porous wall situated on the same side as a high temperature source takes place with heat transfer occurring within the porous wall. The porous wall is the seat of two heat fluxes in opposite directions, namely a conduction flux conveyed by the solid matrix and an advection flux conveyed by the fluid. These two fluxes interact while exchanging power in application of an exchange mechanism known as "transvection" which, at the microscopic level of the pores, corresponds to peripheral convection of the fluid in contact with the solid matrix. This transfer of heat from the hotter wall towards the cooler fluid modifies the two opposing fluxes of conduction and of advection. The power extracted from the incident conduction flux is taken up by the advection flux conveyed by the fluid and is returned to its origin, i.e. to the high temperature source. The conduction flux progressing towards the cold zone is thus reduced by this extracted power. The intensity of the thermal coupling within the wall between the wall material and the fluid, i.e. the internal heat exchange coefficient, depends on the internal geometry of the porous medium, on the nature of the fluid, and on the flow rate of the flow.

Cooling by transpiration has already been considered for a rocket engine propulsion chamber whose wall is exposed on one of its faces to the heat flux coming from the combustion and which must nevertheless be maintained at a temperature below the acceptable limit for the material from which it is made and compatible with mechanical strength requirements. In such cooling by transpiration, the low temperature source is constituted by one of the propellant components that is at ambient or cryogenic temperature, and the wall of the chamber is made of a porous material that is permeable to the cooling propellant component. The transpiration flow passes through the wall prior to being discharged into the combustion chamber. On its path, the fluid takes up heat power from the wall, and as a result keeps it within an acceptable temperature limit. A second cooling effect is also obtained because the fluid discharged into the chamber interposes itself between the wall and the combustion, thereby creating an obstacle to the incident heat flux, even before it reaches the wall.

U.S. Pat. No. 3,832,290 and U.S. Pat. No. 3,910,039 thus describe a rocket engine combustion chamber having a porous wall with ribs applied to the external face thereof to constitute approximately rectangular fluid application compartments that are regularly distributed over the entire periphery of the chamber. An outer intermediate wall defines the outside face of the compartments remote from the porous wall. A single calibrated cooling fluid feed orifice is formed in each compartment through the outer intermediate wall to adjust the value of the looked-for transpiration flow rate in each compartment. The devices described thus make it possible to achieve a degree of adjustment of the transpiration cooling flow rate so as to match the various zones of the chamber to constant porosity for the inside wall, but such matching can be performed only in discontinuous manner from one compartment to another. In addition, making known combustion chambers capable of enabling cooling to be performed by transpiration requires a large amount of machining and thus gives rise to a high manufacturing cost.

In application FR 2 691 209, previously filed by the Applicant, the cooling fluid flow rate is controlled progressively and continuously over the entire section of the enclosure, firstly by using a sheath which, by being applied directly against the outside face of the porous wall provides spatially-modulated hydraulic calibration, and secondly by providing a local perforation density that can vary progressively, defining within each section a cooling fluid rate through the porous wall which matches the heat flux applied to the inside face of the porous wall. However, the techniques used for making such an enclosure require advanced technologies. In addition, the mechanical strength of the enclosure obtained in that way is very closely tied to the dimensioning and the choice of material for the sheath, and also to the cooling fluid flow conditions.

OBJECT AND BRIEF DESCRIPTION OF THE INVENTION

The invention seeks to mitigate the above-specified drawbacks by enlarging the field of application of present cooling systems resulting from transpiration from the porous wall of an enclosure containing hot gases, and to simplify the making of such an enclosure.

These objects are achieved by an enclosure containing hot gases cooled by transpiration and a method of manufacturing the enclosure. The enclosure comprises a porous wall whose inside face forms the internal wall of the enclosure, and means for applying a cooling fluid to the outside face of the porous wall, which means are located between the internal wall of the enclosure and an external sealing body of the enclosure, to cause a flow of cooling fluid to pass by transpiration through the porous wall, wherein the means for applying cooling fluid comprise a plurality of cooling liquid distribution pipes regularly disposed around the porous wall and terminating tangentially on the outside face thereof in a plurality of superposed horizontal injection levels, and feed channels crossing substantially perpendicularly through the distribution pipes extending between each of them and connected to cooling liquid feed means, calibration ducts of determined section connecting, at each injection level, each of the vertical feed channels to two horizontal distribution pipes surrounding them so as to provide predetermined headloss at the inside face of the porous wall, which headloss is adjusted as a function of the zone to be cooled so as to optimize the cooling flow rates along the porous wall.

The porous wall may form only a central portion of the inner wall of the enclosure, the non-central portions of the inner wall of the enclosure being constituted by inner envelopes mounted to extend the porous wall and advantageously being fixed by being welded to opposite ends thereof.

With this particular structure, it is possible to obtain much greater pairs of enclosure diameter and of enclosure pressure than those presently in existence, and to obtain much better control of enclosure cooling. In addition, since the calibration ducts are situated upstream from the porous wall, they are protected from the hot gases, thereby avoiding any risk of failure by an avalanche effect.

Preferably, each envelope is held at its end that is not in contact with the porous wall by flexible spring-effect metal elements connected to the enclosure body, and each inner envelope includes a plurality of mutually adjacent circulation channels closed by a shell assembled on the outside surface of the envelope, and defining a cavity in which the cooling liquid flows.

The cooling fluid comes from a feed torus disposed at one end of the enclosure and opening to the cavity.

Each feed channel of the central portion of the enclosure opens out at its two ends into respective upstream and downstream annular distribution grooves into which the circulation channels also open out.

In a first embodiment tending to limit cooling liquid leakage, the end of each distribution pipe remote from the porous wall is closed by a plug. In a second embodiment, all the distribution pipe ends remote from the porous wall are closed simultaneously by one or more circularly symmetrical plates.

Preferably, the distribution pipes are of polygonal or circular section.

In a first embodiment of the porous wall, it is constituted by superposed layers of metal cloth having determined pore size, high mechanical strength, and deposited on the inside surface of the enclosure by hot rolling. In a second embodiment, the porous wall is made directly on the inside surface of the enclosure by plasma forming or by a powder metallurgy technique using a one- or two-component powder. In a third embodiment, the porous wall is constituted by a conductive metal sheet having a plurality of microholes, the wall being hot- formed on the inside surface of the enclosure and being welded thereto by diffusion.

Advantageously, the cooling fluid is a cryogenic fluid.

The enclosure may be constituted by a propulsion chamber of a rocket engine whose throat ring forms the central portion of the enclosure.

The present invention also provides a method of manufacturing an enclosure containing hot gases cooled by transpiration, in which an internal portion of the enclosure is made initially, after which a porous wall is formed on the inside face of said internal portion, and then the assembly is engaged in an outer body of the enclosure, wherein, to make the internal portion of the enclosure which is constituted by a structural part, distribution pipes are pierced for conveying the cooling liquid to the porous wall, feed channels are pierced for feeding said distribution pipes with cooling liquid, and calibration ducts are pierced connecting said feed channels to said distribution pipes, and of a section that defines determined headloss, after which each of the distribution pipes is closed by an insert fitting exactly to the inside dimensions of the distribution pipe in which it is inserted.

The inserts are made of a material that is incompatible with any adherence or welding with the material forming the porous wall that covers the inside face of the central portion, which makes them easy to remove, mechanically or chemically, after the porous wall has been formed and without damaging it.

The porous wall may be made by hot rolling superposed layers of metal cloth on the inside surface of the inner portion of the enclosure, the pore size of the cloth being determined and its mechanical strength being high, either directly on the inside surface of the central portion of the enclosure by plasma forming or by a powder metallurgy technique. With such a technique, when using a two-component powder, it is possible, after compacting, to eliminate one of the two components of the powder by chemical means, thereby creating the desired wall porosity. Nevertheless, more conventionally, the porous wall may merely be made by diffusion welding a hot-formed conductive metal sheet including a plurality of microholes to the inside surface of the inner portion of the enclosure.

BRIEF DESCRIPTION OF THE DRAWINGS

Other characteristics and advantages of the invention appear from the following description of particular embodiments, given with reference to the accompanying drawings, in which.

DETAILED DESCRIPTION OF PARTICULAR EMBODIMENTS

Reference is initially made to FIGS. 1 to 5 which, by way of example, show an enclosure containing hot gases and constituted by a propulsion chamber of a rocket engine.

A propulsion chamber is conventionally made up of a chamber body 10 which serves both to transmit mechanical forces and to provide sealing relative to the outside, being generally venturi-shaped, having a converging portion and a diverging portion, an inner envelope 12 which constitutes the internal wall of the propulsion chamber, and a cavity 14 defined between the chamber body 10 and the inner envelope 12, and enabling a cooling liquid to circulate.

Figure 5:
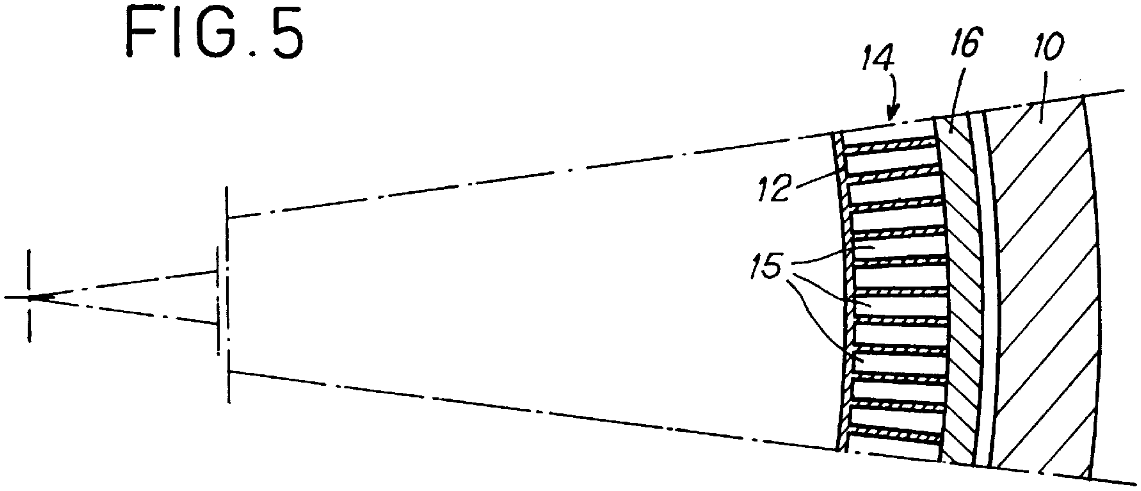

In the embodiment shown, which relates to a conventional regenerative circuit, the cavity 14 for cooling liquid circulation is made up of a plurality of mutually adjacent circulation channels 15 made in the inner envelope 12. When these channels are made by milling, a shell 16 is assembled on the outside surface of the envelope by brazing or by electro-erosion, in order to close the cavity (FIG. 5).

In accordance with the invention, the inner envelope 12 which is in contact with the hot gases is interrupted at least at the throat of the nozzle so as to integrate therein a porous wall 20 which serves firstly a conventional function of confining the flow of combustion gases in the space defined by said circularly symmetrical wall, and secondly serves to establish heat exchange between the heat flux coming from the combustion gases and the cooling liquid which is applied to the outside face of the porous wall 20 to "transpire" through the wall. An inner envelope formed in this way has two portions which extend the porous wall 20 in opposite directions, and they are held at each end to the chamber body 10 by flexible metal elements 22 providing a spring effect so as to accommodate differential thermal expansion between the porous wall and the envelope.

A ring 18 situated at the throat of the nozzle and made of a material having both good conductivity and good mechanical strength, such as a copper-based alloy, is interposed between the porous wall 20 and the chamber body 10 and includes means for applying the cooling fluid to the outside face of the porous wall. The throat ring 18 is fixed to the chamber body 10 by fastening means 24, e.g. constituted by hook-shaped projections present on the body and engaging the ring, or by assembly zones between the ring and the chamber (e.g. an assembly ring).

The choice of a composite structure comprising both a metal (on the substantially cylindrical portion towards the injector and on the conical portion in the diverging portion of the chamber), and a porous material (at the throat) for making the propulsion chamber is justified by the fact that it is in the vicinity of the nozzle throat that the incident heat flux is locally greatest, and consequently it is specifically at that location where cooling must be the most effective (without excessive headloss). Nevertheless, it is possible to envisage a structure without metal portions in which the porous wall 20 covers the entire enclosure, thereby avoiding any need to use an inner envelope 12 for ensuring continuity of the inside wall of the enclosure, as before.

The porous wall 20 has a permeable structure, and its thickness may be a few millimeters, having a grain size lying in the range 50 $\mu$m to 200 $\mu$m and including a sufficient number of open pores to avoid calibrating the flow in this zone. As explained more fully below, the wall may be made of superposed layers of metal cloth, or more conventionally, by a metal material manufactured by powder metallurgy, or by a conductive metal sheet provided with microholes.

In accordance with the invention, the cooling fluid is bought to the porous wall 20 by a plurality of distribution pipes 30 formed in the throat ring 18 and regularly distributed around the chamber. These pipes 30, all of which terminate tangentially to the porous wall 20, are disposed in a plurality of superposed injection levels along the entire length of the throat. They are fed with cooling liquid from feed channels 32 which cross through the pipes substantially perpendicularly and which are united at either end of the throat in downstream and upstream distribution grooves 33 disposed at the inlet to the cavity 14 and into which the circulation channels 15 open out. A link at each injection level between each of the feed channels 32 and the two surrounding distribution pipes 30 is provided by two calibration ducts 34 of section that is determined to obtain the desired headloss and that is adjusted as a function of the zone to be cooled so as to optimize cooling flows along the porous wall 20. Thus, the cooling fluid passes from the upstream circulation channels 15 to the distribution groove 33 which then feeds the channels 32 (feed channels of the porous wall) after which the fluid that remains passes into the groove 33 and is taken away by the channels 15 to go to the injector.

Figure 1:
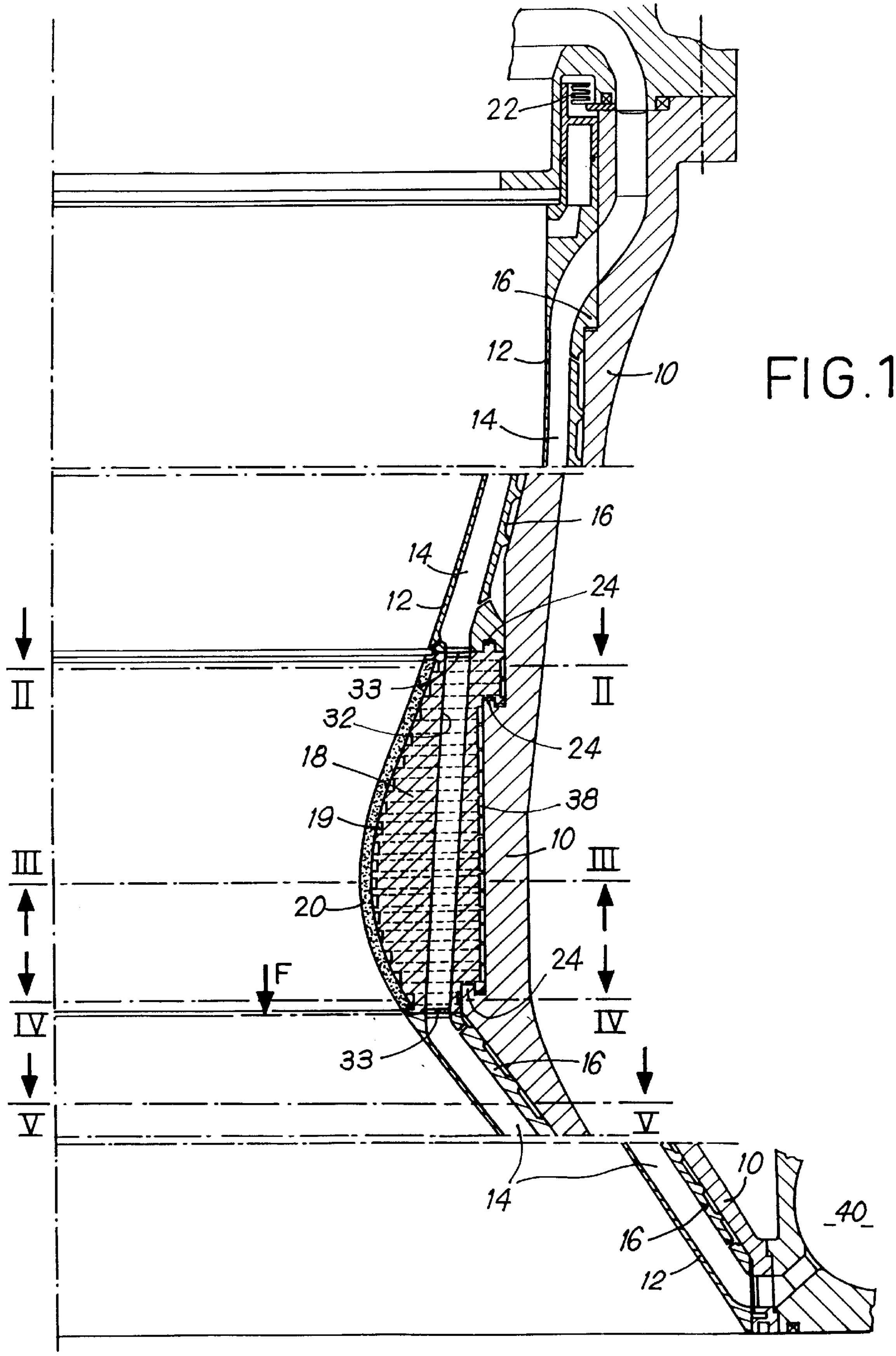
FIG. 1 is an axial half-section view of a particular embodiment of a device of the invention for cooling by transpiration as applied to a rocket engine combustion chamber.
Figure 2:
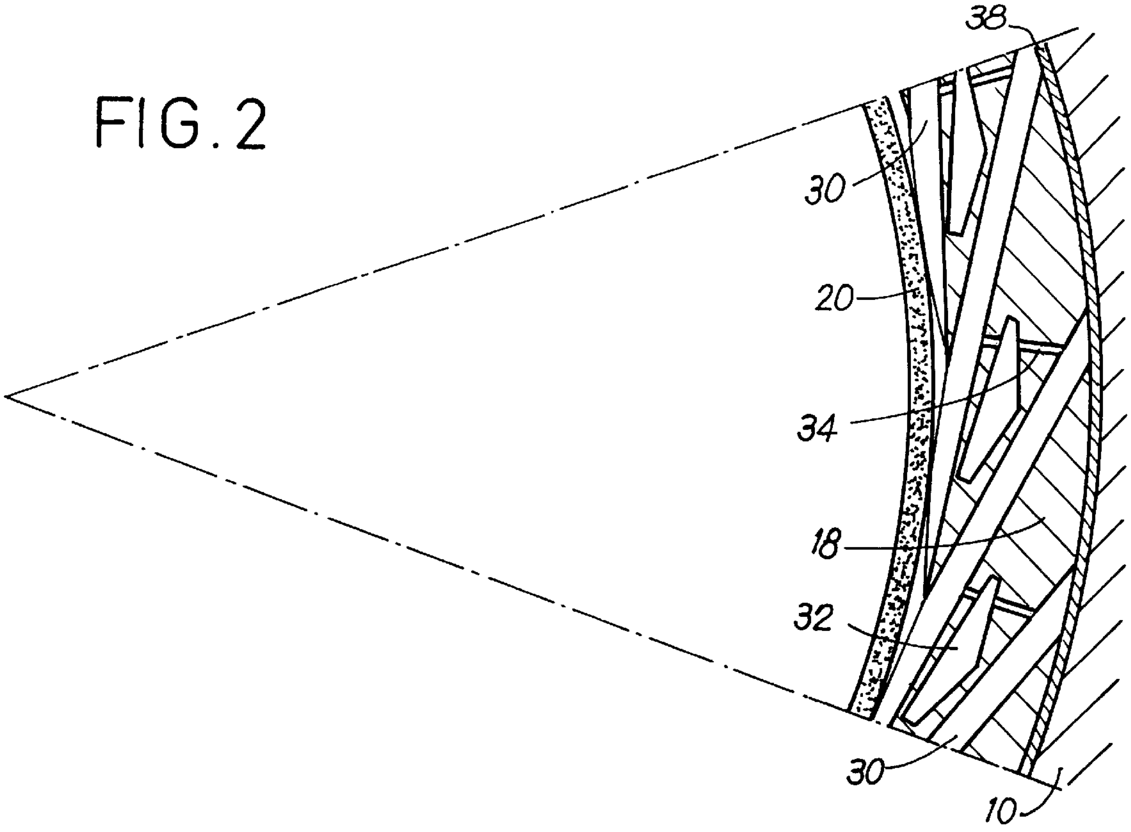
FIGS. 2 to 5 are fragmentary sections on planes II, III, IV, and V respectively of FIG. 1.
Figure 3:
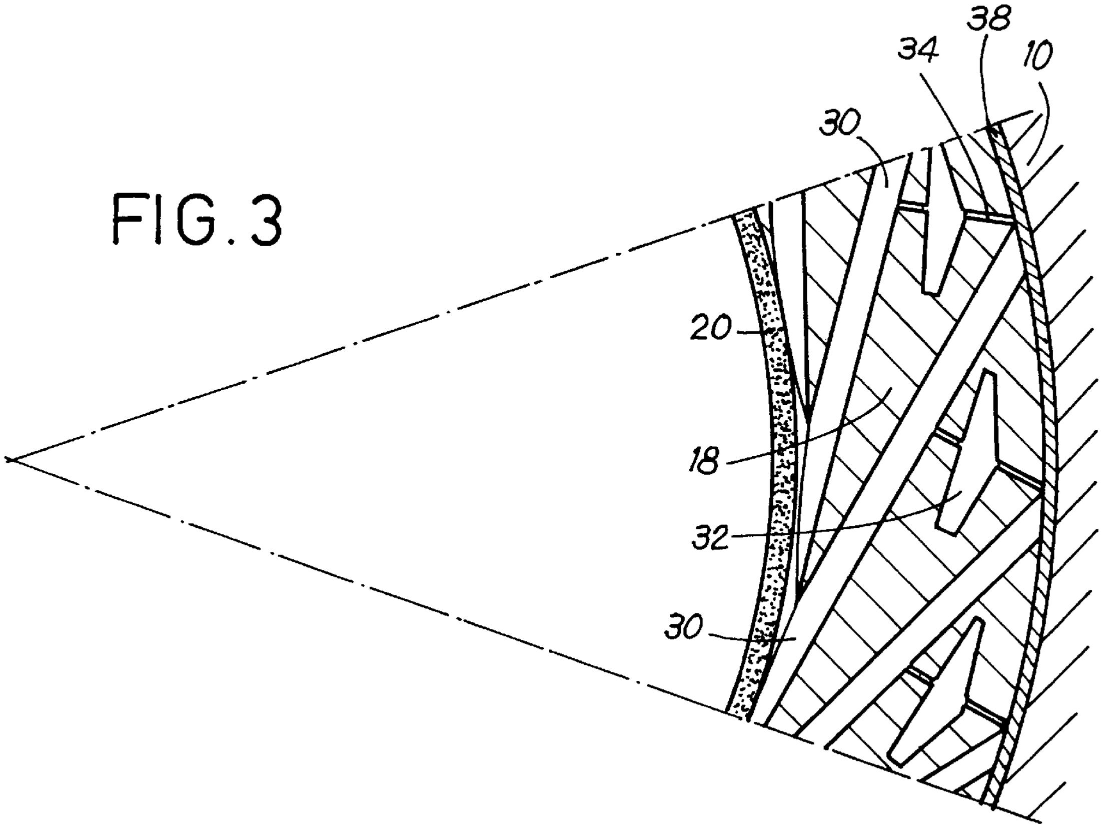
Figure 4:
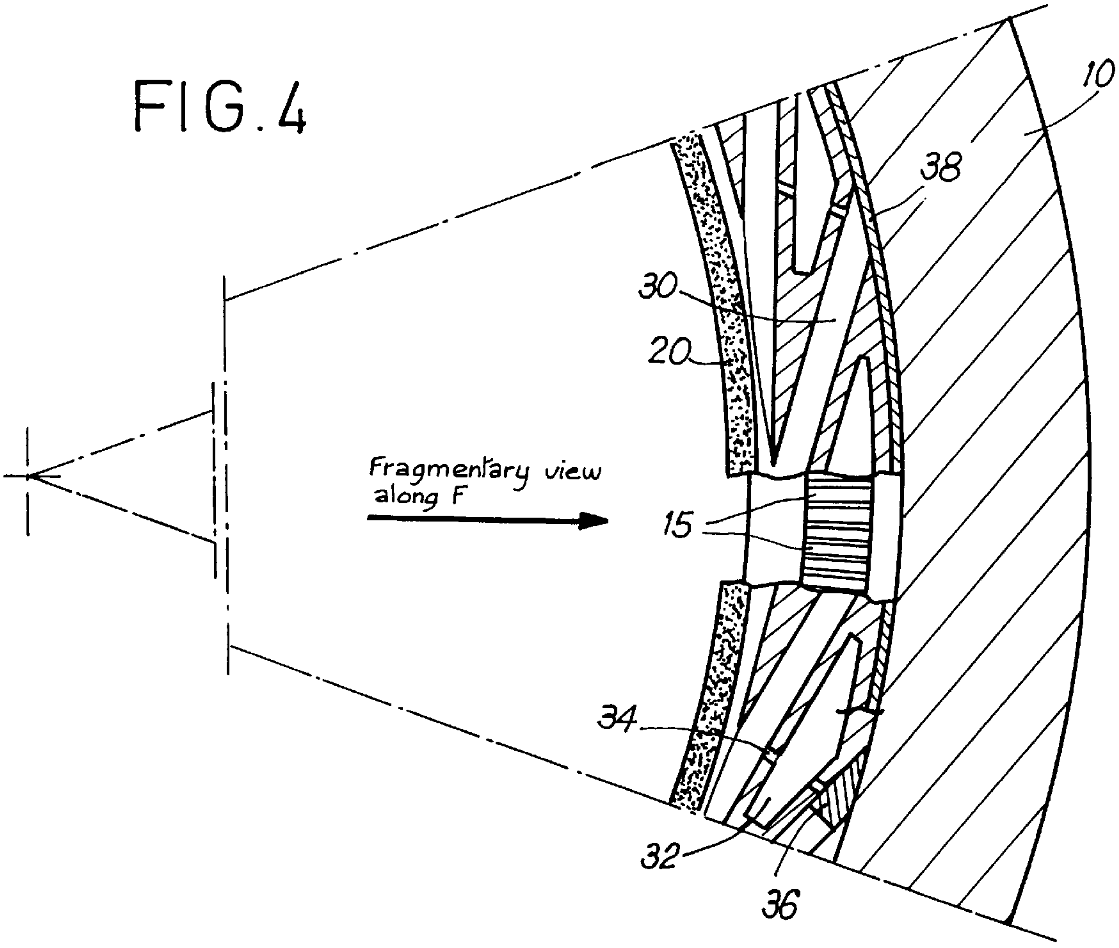

In order to enable the cooling flow rates to be maintained practically constant and in order to limit leakage, the various distribution pipes 30 are closed at their ends remote from the porous wall 20, either individually by using plugs 36, for example, or else collectively using one or more superposed circularly symmetrical plates 38 shrink-fitted on the throat ring (see FIG. 4 where both variants are deliberately shown simultaneously). Similarly, on the hot gas side, the cooling liquid coming from the distribution pipes 30 can be distributed via a groove 19 situated immediately behind the porous wall 20 and at which the pipes 30 terminate.

Within the ring 18, the cooling fluid that is going to transpire passes from the channels 32 towards the calibration ducts 34 and then along the pipes 30, and finally towards each groove 19 prior to passing into the porous wall 20.

The cooling fluid is preferably a cryogenic fluid, such as one of the propellant components of the rocket engine, and it may be delivered to the various circulation channels 15 from a feed torus 40, e.g. disposed at the junction between the rocket engine nozzle and the diverging element fitted downstream therefrom (when cooling by means of a regenerative circuit). Nevertheless, the structure of the invention is entirely usable with more conventional cooling by taking a fraction of the injection fluid from the injector of the rocket engine ("dump" cooling).

Various methods of manufacturing an enclosure, such as a rocket engine propulsion chamber, are described below as examples, each implementing a system of the invention for cooling by transpiration.

Firstly, the chamber body 10 is manufactured as a single piece by forging or casting or by any other conventional technique. The throat ring 18 (FIG. 5) is likewise manufactured in conventional manner, e.g. by machining, with the distribution pipes 30 being formed selectively in the throat in a determined injection configuration (depending on the desired number of pipes and of injection levels). The pipes are preferably circular in section, but it is also possible to use any polygonal section, e.g. square. The feed channels 32 are then pierced between each of the various distribution pipes 30 in a plane substantially perpendicular thereto (e.g. by milling or by EDM machining). Finally, the calibration ducts 34 are pierced from the outside surface of the ring 18 to run from one distribution pipe to another, passing through a feed channel.

Figure 6:
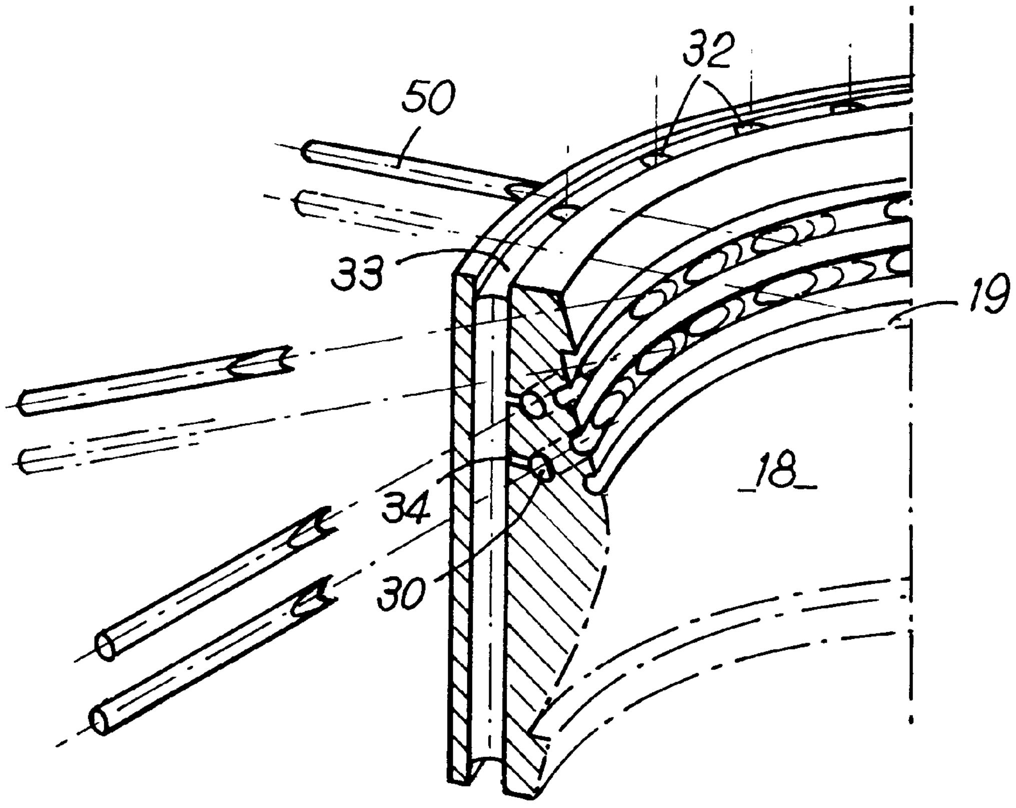
FIG. 6 is a perspective view of the throat ring with inserts for implementing cooling liquid distribution pipes.
Figure 7:
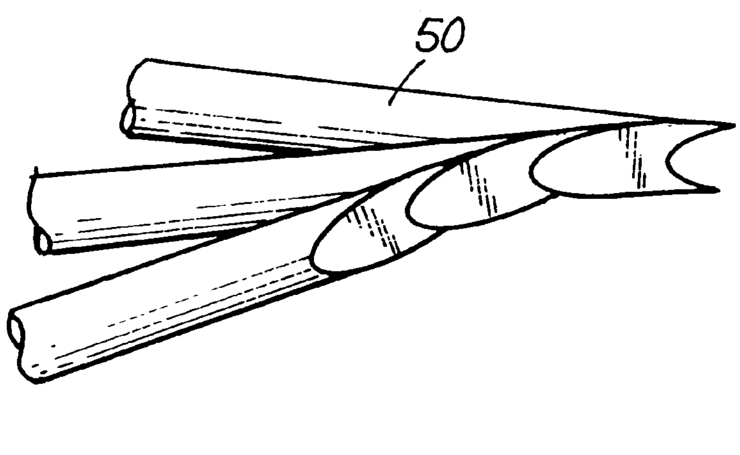
FIG. 7 is a diagram showing how the various inserts are mutually engaged in the throat ring.

Inserts 50 in the form of pins whose outside dimensions match the inside dimensions of the pipes are made of a material which is selected so as to ensure that no adhesion or welding can take place between the pins and the porous material used subsequently for making the porous wall 20. Each distribution pipe 30 receives a respective insert so as to occupy its volume exactly, and the ends of the inserts are machined so as to guarantee a uniform inside surface for the throat ring (FIG. 6).

Three different techniques can be used for making the porous wall 20. In a first method, a hot rolling technique is used to deposit on the inside surface of the throat ring 18 superposed metal cloths of the type known under the name Dynapore from Michigan Dynamics (USA) or Rigimesh from Thyssen (Germany). This causes the wires of the cloths to be welded by diffusion to one another and to the ring 18 with the exception of the spaces corresponding to the ends of the inserts 50 (the inserts being, by design, made of a material that is incompatible with such adherence). In a second method, the porous material is merely deposited on the inside face of the ring 18 which then constitutes a substrate, deposition being by plasma forming or by a powder metallurgy technique. After the material forming the porous wall 20 has been deposited, the inserts 50 are removed mechanically or chemically so as to leave in the inside wall of the ring, an annular manifold 19 at each injection level with the section thereof depending on that of the inserts (although a larger section may also be envisaged), with the various distribution pipes 30 terminating therein. It may be observed that the powder is advantageously a two-component powder, with one of the two components of the powder being suitable for being eliminated chemically after compacting so as to create determined porosity in the wall 20. Finally, in a third method, the porous wall 20 may merely be constituted by a conductive metal sheet (e.g. of copper) pierced by microholes (e.g. made by a laser technique) that is hot-formed on the ring 18 and is then diffusion welded to the inside face of said ring.

The throat ring 18 provided with its porous wall 20 can then be mounted in the chamber body 10, with the fastening means 24 on the body guaranteeing proper assembly. Finally, the inside wall of the propulsion chamber is finished off by installing the inner envelopes 12 which are welded to the ends of the ring 18 via two lips left upstream and downstream from the ring 18. These lips and the welds can be cooled by a very thin film of fresh propellant taken from the regenerative cooling circuit. The two portions of the envelope 12 are made conventionally by milling and then they are closed by means of a shell-forming wall 16 either by electrodeposition or by brazing. It is recalled that this last step of adding inner envelopes 12 is justified only when the porous wall constitutes a portion only of the inside wall of the enclosure.

It is important to observe that although it is assumed above that the chamber body is previously manufactured by conventional techniques, it too could be made by an electrodeposition method once the inner envelopes 12 have been assembled to the ring 18 and the porous wall 20 has been formed on said ring. Naturally, masks would need to be provided to protect the envelopes and the porous wall during such an electrodeposition step.

The propulsion chamber obtained in this way is particularly suited to high combustion pressures (greater than 200 bars for medium- and high-thrust engines). In addition, because the chamber body is voluntarily separate from the cooling system, it is possible to decouple the function of cooling from the function of providing mechanical strength, thereby making it possible to make the chamber body out of materials having very high characteristics for taking up general forces and pressure forces while the internal cooling system is not greatly loaded, even at the throat of the nozzle.

In addition, and this constitutes another major advantage of the present structure, flow rate calibration is performed by calibration ducts disposed a considerable distance upstream from the porous wall, thereby making it possible to maintain an acceptable level of cooling even if the porosity of the wall should decrease due to compression under the effect of the temperature increase of the wall subjected to the hot combustion gases, thus making it possible to avoid any destructive effect.

We claim:

1. A method of manufacturing an enclosure containing hot gases cooled by transpiration, the method comprising:
   - forming an internal portion of the enclosure comprising:
     - providing a structural part having an inside face and an outside face,
     - providing distribution pipes in the structural part located to convey a cooling liquid to the inside face of the internal portion,
     - providing feed channels in the structural part located to feed the distribution pipes with the cooling liquid,
     - providing calibration ducts in the structural part located to connect the feed channels to the distribution pipes, the calibration ducts having a section that defines a determined headloss, and
     - closing the distribution pipes with inserts, the inserts sized to fit inside dimensions of the distribution pipes in which the inserts are inserted;
   - forming a porous wall on the inside face of the internal portion; and
   - engaging the internal portion and the porous wall in an outer body of the enclosure.

2. The method of claim 1, further comprising forming the inserts of a material that is incompatible with adherence or welding with a material forming the porous wall.

3. The method of claim 1, further comprising removing the inserts after the porous wall has been formed on the inside face of the internal portion and before the internal portion and the porous wall have been engaged in the outer body.

4. The method of claim 1, further comprising forming the outer body by electrodeposition of a metal on the outside surface of the internal portion.

5. The method of claim 4, wherein the metal comprises nickel.

6. The method of claim 1, further comprising forming the internal portion only in a central portion of the enclosure, two inner envelope portions being added to the central portion for ensuring continuity of the enclosure.

7. The method of claim 6, further comprising forming a rocket engine propulsion chamber with the enclosure, the central portion of the enclosure forming a nozzle throat.

8. The method of claim 1, further comprising forming the porous wall by hot rolling superposed layers of metal cloth on the inside face of the internal portion, the metal cloth having a determined pore size and high mechanical strength.

9. The method of claim 1, further comprising forming the porous wall directly on the inside face of the internal portion by plasma forming or by a powder metallurgy technique.

10. The method of claim 8, further comprising forming the porous wall by using a two-component powder, one of the two components being eliminated chemically after compacting to create a determined porosity.

11. The method of claim 1, further comprising forming the porous wall by diffusion welding a hot-formed conductive metal sheet including a plurality of microholes to the inside face of the internal portion.

12. The method of claim 1, further comprising forming a rocket engine propulsion chamber with the enclosure.

* * * * *